(12) United States Patent
Erdmann et al.

(10) Patent No.: US 7,443,589 B2
(45) Date of Patent: Oct. 28, 2008

(54) OPTICAL COMPONENT FOR BEAM SHAPING (75) Inventors: Lars Erdmann, Hörselgau (DE); Alexander Pesch, Jena (DE); Arnaud Deparnay, Jena (DE)

(73) Assignee: Carl Zeiss SMS GmbH, Jena (DE)

( * ) Notice: Subject to any disclaimer, the term of this patent is extended or adjusted under 35 U.S.C. 154(b) by 302 days.

(21) Appl. No.: 11/412,059

(22) Filed: Apr. 26, 2006

(65) Prior Publication Data

US 2006/0238876 A1 Oct. 26, 2006

(30) Foreign Application Priority Data

Apr. 26, 2005 (DE) .................. 10 2005 019 257

(51) Int. Cl.
  *G02B 27/10* (2006.01)
(52) U.S. Cl. .................. 359/618; 359/620; 359/626
(58) Field of Classification Search ............ 359/66–628
See application file for complete search history.

(56) References Cited

U.S. PATENT DOCUMENTS

2002/0034710 A1 3/2002 Morris et al.

2002/0145797 A1 10/2002 Sales

FOREIGN PATENT DOCUMENTS

DE 196 23 749 A1 5/1997

OTHER PUBLICATIONS

Erdmann, Lars, et al., "MEMS based lithography for the fabrication of Microoptical components," *Proc of SPIE*, vol. 5347, pp. 79-84 (2004).

*Primary Examiner*—Ricky Mack
*Assistant Examiner*—Brandi N Thomas
(74) *Attorney, Agent, or Firm*—Patterson, Thuente, Skaar & Christensen, P.A.

(57) ABSTRACT

The invention includes an optics array for beam shaping, which uses a micro lens combination, whose polygonal micro lenses are arranged in a level, whereby the geometric arrangement of the individual lenses and their diameters follow a distribution pattern.

It is characterized by the fact that the number of corners as well as the length of the lens rims of each of the individual lenses of the micro lens combination is defined by a point distribution (P) of Voronoi points (2), which define a Voronoi Region (VR(p)) which can be described by the following equations for a Voronoi lens (1).

$$z(r) = \frac{c \cdot r^2}{1 + \sqrt{1 - (1+k) \cdot c^2 \cdot r^2}} + a_4 \cdot r^4 + a_6 \cdot r^6 + \ldots$$

12 Claims, 9 Drawing Sheets

OPTICAL COMPONENT FOR BEAM SHAPING

RELATED APPLICATION

The present application claims the benefit of priority to German Patent Application No. 10 2005 019 257.2 filed on Apr. 26, 2005. Said application is incorporated by reference herein.

FIELD OF THE INVENTION

The invention relates to an optics array for beam shaping, which uses a micro lenses combination whose polygonal micro lenses are laid out over a surface in which the geometric disposition of the individual lenses and their diameter follow a determined distribution.

BACKGROUND OF THE INVENTION

DE 196 23 749 A1 describes the manufacture of randomly distributed micro lenses by means of lithography and etching techniques. The element generates a rotation symmetrical Gauss distribution out of a convergent radiation. However, the form of the lenses and the openings are defined by the process and can only be varied in very few parameters.

U.S. 200210145797 A1 describes the profile formation and homogenization for a projection screen with the purpose of generating a homogeneously filled rectangular radiation.

P. Rhodes, D. Shealy; "Refractive optical systems for irradiance redistribution of collimated radiation: their design and analysis"; Appl. Opt. Vol. 19, No 20, p. 3545; 1980 describes the deformation of a determined radiation profile in a balanced energy distribution.

The invention is based on the task of creating an optical array for radiation profile formation and/or homogenization, by optimizing a specific light distribution in a radiation zone or by minimizing light losses.

The invention approaches the task where the number of edges as well as the lengths of the lenses edge segments of each individual lens of the micro lens combination are defined through a point distribution (P) and each individual lens has on each of these points a Voronoi point (2), which consequently define a Voronoi Region (VR(P)), in which the equation below describes a Voronoi lens (1):

$$z(r) = \frac{c \cdot r^2}{1 + \sqrt{1 - (1+k) \cdot c^2 \cdot r^2}} + a_4 \cdot r^4 + a_6 \cdot r^6 + \ldots$$

Each Voronoi lens has a minimal radius of curvature R, which has a magnitude 10 to 200 times larger than the maximum distance $d_{max}$, which is the maximum of all distances from the lenses edge points to the fixed vertexes of the lenses. Each vertex of the Voronoi lenses has a clearance A to the Voronoi point of each of the Voronoi lenses that lies between 0 and the radius of curvature R of the Voronoi lens. Thereby the position of the vertex can be selected so that it provides the maximum intensity for an optical configuration of the radiation point.

The Voronoi lenses preferably have a diameter from 10 µm to 25,000 µm. Another approach defines the diameter between 1λ and 1000λ, where λ is the work wavelength. The work wavelength is within the range between 100 nm and 10 µm. The lens depth z is within the range of 0.1 µm and 150 µm. The lens depth z is defined by the height difference between the vertex and the edge point of the Voronoi lens, in which the $d_{max}$ distance is defined. The radius of curvature R lies between 5 µm and 100,000 µm.

The materials used for each wavelength (or wavelength range) may be optically transparent materials such as silicon, quartz, calcium fluoride, glass or polymers.

In general, Quartz or CaF2 are used for the UV range, Glass and Polymers for the visible range and Silicon for the IR range. The thickness of the materials preferably lie between a tenth to one millimeter.

According to the invention, initially, a set of points is fixed over a component surface. Such a set of points mathematically constitute the Voronoi points of the edges of the individual lenses, as well as the number of edges, the geometric shape and the surface size of each of the individual lenses of the micro lens combination. These individual lenses can be subsequently identified as Voronoi lenses.

Furthermore, preferably the position of the Voronoi lenses vertexes is fixed, whereby the points, and thus the lines and/or the surfaces generate the maximum intensity of the optical path of rays in the radiation zone.

The invention is particularly oriented to produce a form of truncated Gauss distribution and different source structures (such as dipoles, quadruple poles, hexapoles) for the Sigma level (aperture simulations). The desired light beam form in the radiation zone will be achieved through the specific Voronoi lenses vertex distribution in the micro lens array, such as for example ring shaped Disars, Quasars or their multiple adjoining dispositions.

Thereby, A is the distance of the Voronoi points in the projection over the components surface, which can either be equal to or larger than zero. Therefore, it must be considered that if a distance A is proportionally large in comparison to the lenses dimension, this will lead to a significant height difference between the adjoining Voronoi lenses, so that the distance A is especially smaller than the selected radius of the Voronoi lenses. The height difference can be minimized by the optimization of the Z distance.

The form of the borders of each Voronoi lens influences the form of the partial light beam that passes through the Voronoi lenses. Therefore, a triple edge shaped Voronoi lens produces a triple edge shaped partial light beam.

A single form of Voronoi lens can be designed through an adequate selection of Voronoi point positions, such as a six-edge configuration.

If in the design of the microstructures, the size of the micro lenses is smaller than the lateral coherent length, a homogenization of light from an infinite distance source takes place through an incoherent overlapping of the partial opening of the entrance field.

For a Gauss shaped intensity distribution, it is advisable to select a Voronoi point distribution, in which the Voronoi lenses are statically arranged in a triple-edge, quadruple edge and sextuple edge shaped array.

The surface of the Voronoi lenses produces a lighted region in the radiation zone of the path of rays with a size corresponding with a partial beam. Therefore the larger Voronoi lenses produce a larger illumination region, and the smaller Voronoi lenses a smaller illumination region. This dimension cannot be varied with the lenses radius of curvature. Large radii produce small fields.

Furthermore, in a particular embodiment of the invention it is foreseen that the surface shape of the Voronoi lenses is an open surface which is no longer described over a radial indication. Such surface shapes are for example spherical or cylindrical shapes.

These shapes can be described with the classic lens equation, whereby $a_4$ is the spherical coefficient and the first imprint of the conical section of the depicted surface, where k is the conical constant:

$$z(r) = \frac{c \cdot r^2}{1+\sqrt{1-(1+k)\cdot c^2 \cdot r^2}} + a_4 \cdot r^4 + a_6 \cdot r^6 + \ldots$$

Where $0 \leq r \leq d_{max}$ and $c=1/R$.

Through the large scale dimensional possibilities of this optics, a beam of rays can be transformed into any of the desired beam shapes. The design may be calculated with the procedure described in Lars Erdmann, Arnaud Deparnay, Falk Wirth and Robert Brunner: "MEMS based lithography for the fabrication of micro optical components" Micromachining Technology for Micro-Optics and Nano-Optics II, edited by Eric G. Johnson, Gregory P. Nordin, Proceedings of SPIE Vol. 5347, p. 79-84, 2004 and the structure will be illuminated. A Digital Mirror Device serves as a mask generator in the lithographic procedure. When compared to the current State of the Art techniques, the described procedure offers more design parameters freedom. The different parameters are:

Radius of curvature (always equal or different)
Spherical/aspherical, concave/convex lenses or their combinations
Changes in the position of the optical center
Polygonal form
Polygon filling The structure can be produced with the help of different lens shapes. It is possible to have rectangular, square or arbitrary (Voronoi) picketing. For coherent illumination problems, it is preferable to use statically distributed Voronoi structures. If possible, the entrance beam should completely and convergently illuminate the refractive element. The use of incoherent sources may be preferred. The use of many adequate micro lenses makes the exit shape largely independent from the entrance shape and from entrance beam intensity distribution.

BRIEF DESCRIPTION OF THE DRAWINGS

The invention is subsequently described by the following Figures. They show.

DETAILED DESCRIPTION OF THE INVENTION

According to FIGS. 1 to 4, the invention solves many of the above discussed problems by producing a sectioned Gaussian distribution in the focal level of a lens through a refractive micro lens array.

Figure 1:
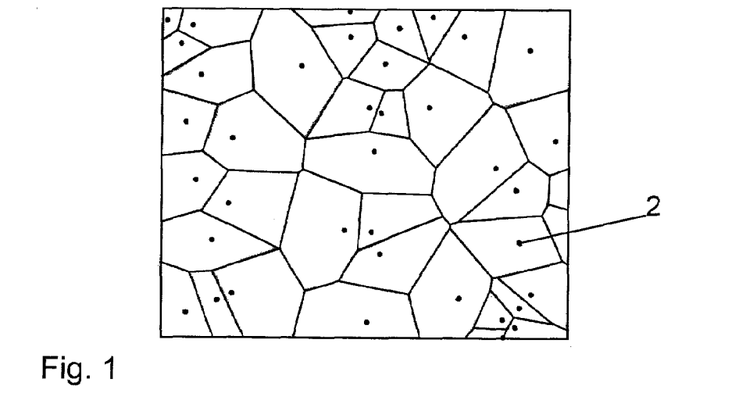
FIG. 1: Voronoi diagram for a design with a sectioned Gaussian distribution.

FIG. 1 shows a Voronoi diagram which depicts a structure for storing point quantities that support the proximity requests. The Voronoi diagram VD (P) for a quantity of points P in the level is a flat subdivision of the level in such a way that for each point p a point P is defined in the Voronoi region VR(p) which includes all the points q in the level which are closer to p than to all the other points on P. Each Voronoi region has a focal point, the Voronoi point 2.

Figure 2:
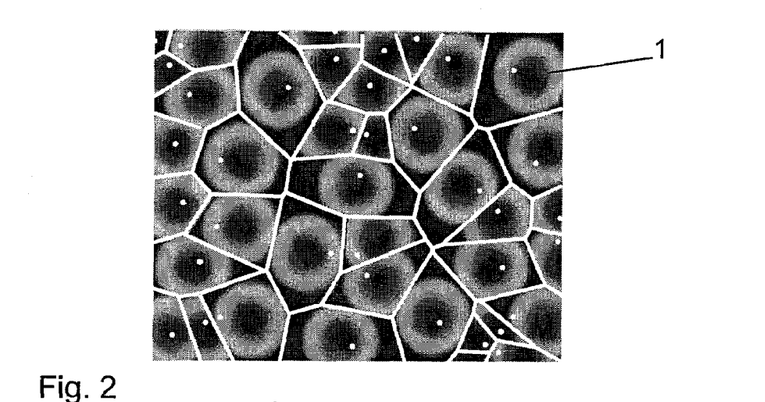
FIG. 2: Lens structure according to FIG. 1 with chrome mask.

FIG. 2 shows the static distribution of the micro lenses which are fitted in the Voronoi Regions VR(p) which will subsequently be identified as Voronoi lenses 1.

When a sectioned Gaussian distribution is produced, a static analysis of the micro lenses is used with the parameters, in order to define the Gauss width.

The Gauss tail comes from the region of the individual micro lenses, which is remote from the middle point of the lenses center. The Gauss is only sectioned in a defined width, in which also the lens region that is larger than a determined radius, in which an illumination distribution cannot be used. The simplest way to prevent this is by placing a chrome mask 4 over the lenses array that simply screens off the outside region of each Voronoi lens 1.

Figure 3:
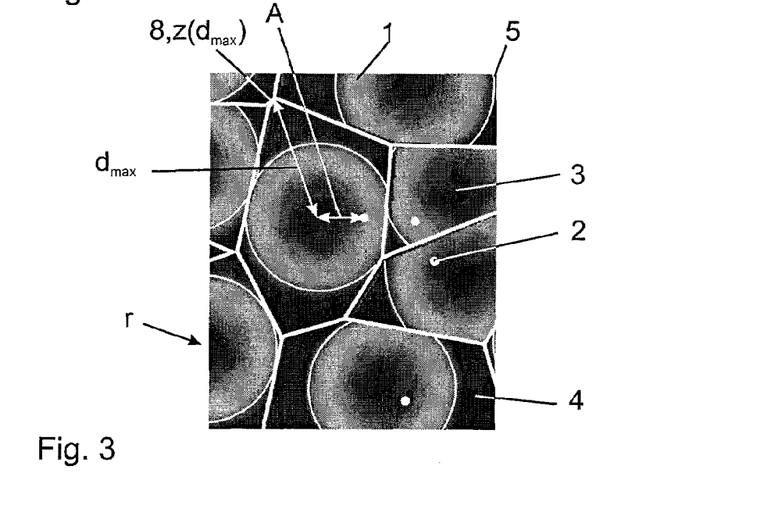
FIG. 3: Enlargened section from FIG. 2.
Figure 4:
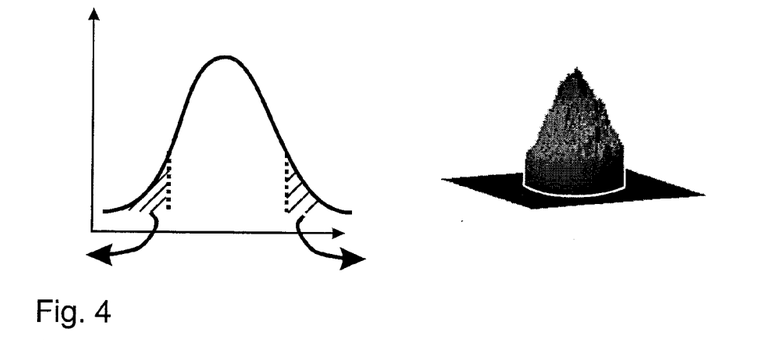
FIG. 4: A sectional view of a Gaussian distribution with a lens structure according to FIG. 2.

FIG. 3 shows a section of FIG. 2 for improving the clarification of the chrome mask 4. The Voronoi lens with their lens rims 5 are shown in FIG. 4. Voronoi point 2 is at a distance A from the vertex of Voronoi lens 1, which is placed here for each of the statically distributed Voronoi lenses 1 between 0 and 10 $d_{max}$. If A is smaller than $d_{max}$, vertex 3 is located inside Voronoi lens 1. If A is larger than $d_{max}$, vertex 3 is located outside the Voronoi lens 1. Generally, vertex 3 normally will not coincide with Voronoi point 2.

Furthermore, every Voronoi lens 1 has a radius of curvature R, which can measure between about 5 μm and about 100,000 μm. Distance $d_{max}$ is the separation measured between the farthest located edge point 8 and vertex 3 of the Voronoi lens. The z ($d_{max}$) dimension corresponds to a depth of Voronoi lens 1, which is measured between vertex 3 and the farthest located edge point 8.

As it is described in FIG. 4, the light from the tail is not usable, as it is influenced or blocked by chrome mask 4.

Figure 5:
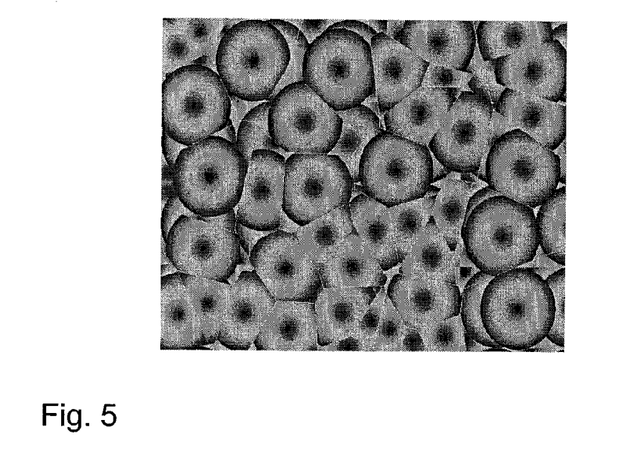
FIG. 5: Lens structure according to FIG. 1 with a different micro lens distribution.
Figure 6:
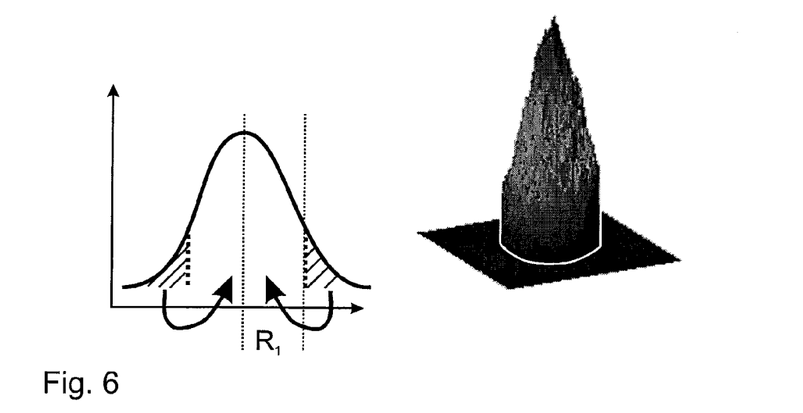
FIG. 6: A sectional view of a Gaussian distribution with a lens structure according to FIG. 5.

FIG. 5 shows a further aspect of the invention in which the efficiency of the micro lens array has been increased. This can be achieved when the region from FIG. 2 is masked with chrome mask 4, with a further distribution is filled by micro lens 1, that fulfills the conditions for a sectioned Gaussian distribution. This can be achieved, for example, with regular lenses (for the column of the sectioned Gauss) or as it is shown in FIG. 5, with the rest of the parts from the static lenses for the Gaussian distribution. In comparison with FIG. 4, FIG. 6 shows that the light from the tail is included with the energy distribution of the sectioned Gauss and may lead to an efficiency increase.

FIGS. 7-12 show further application examples which can be achieved with a Dipole source.

Figure 7:
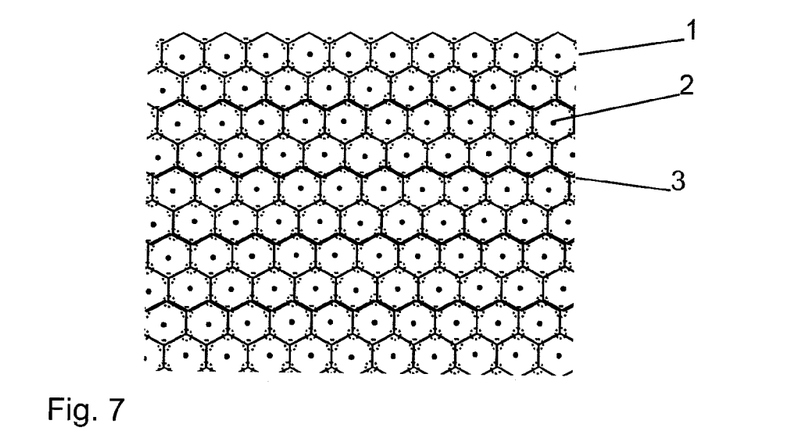
FIG. 7: Voronoi diagram with hexagonal surface distribution in the design of a Dipole source.
Figure 8:
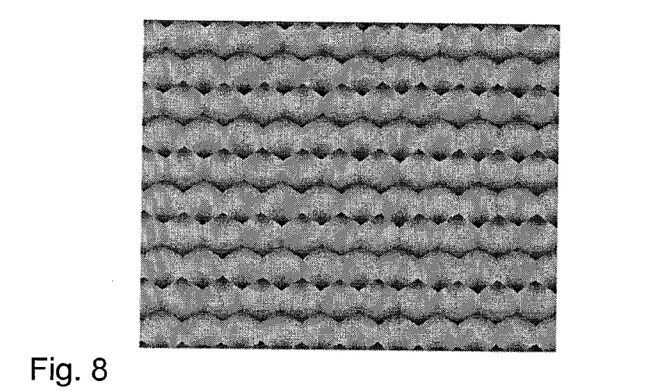
FIG. 8: Lens structure according to FIG. 7.
Figure 9:
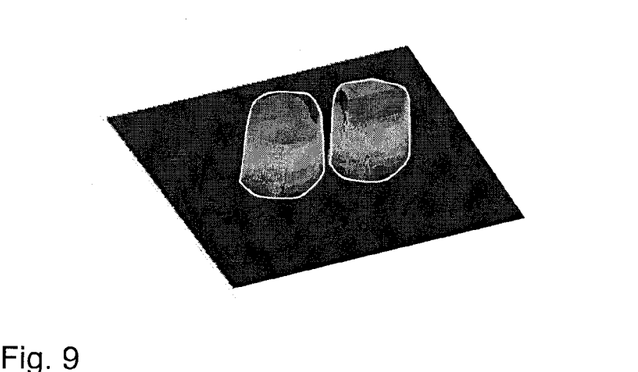
FIG. 9: Dipole intensity distribution in the field levels

According to FIG. 7 the surface can be distributed in six edges, which correspond to the posterior lens surfaces. Voronoi point 2 delivers a hexagonal surface distribution. Furthermore, vertex 3 is located on the opposite corresponding edge of the figure. FIG. 8 shows the corresponding lens structure. FIG. 9 shows the intensity distribution in the field levels.

Figure 10:
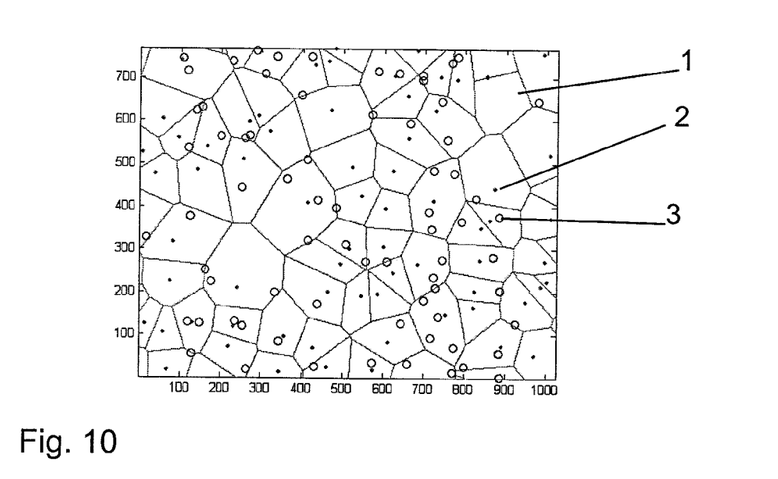
FIG. 10: Voronoi diagram with static surface distribution for the design of a Dipole source.
Figure 11:
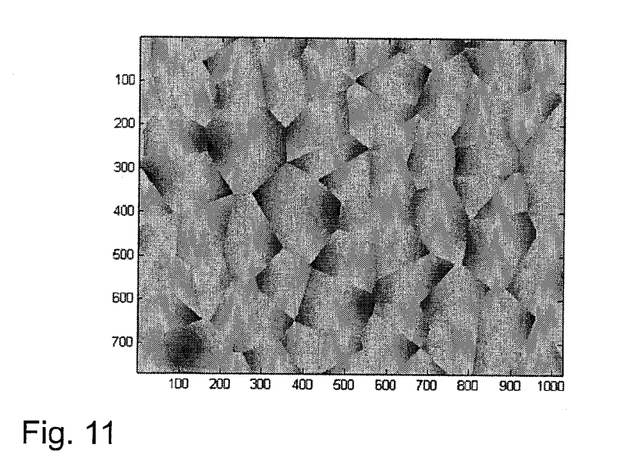
FIG. 11: Lens structure according to FIG. 10.
Figure 12:
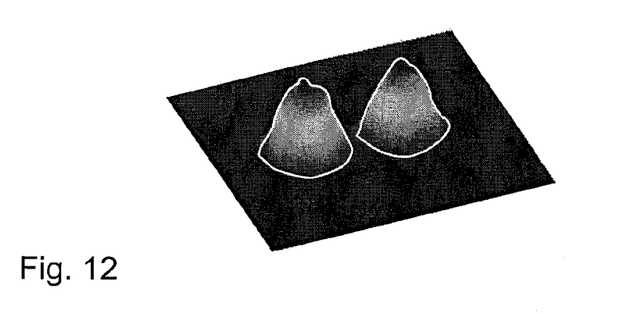
FIG. 12: Dipole intensity distribution in the field levels.

The solution illustrated in FIGS. 10 to 12, uses a static micro lens array like the one shown in FIG. 3. Here, vertex 3 of Voronoi lens 1 is shifted to a determined size which corresponds to the further distance to the dipole point. A section of vertex 3 is shifted in a direction as well as another part is in the opposite direction, in the example each is one half. FIG. 10 shows the static surface distribution through Voronoi point 2 as well as the fixed vertex 3 for generating the Dipole source. FIG. 11 shows the corresponding lens structure. FIG. 12 shows the intensity distribution in the field levels.

FIGS. 13 to 18 show further application examples that include annular sources.

Figure 13:
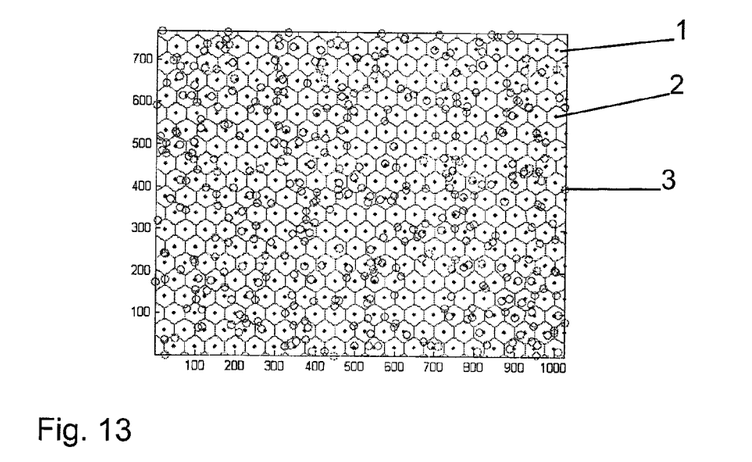
FIG. 13: Voronoi diagram with hexagonal surface distribution for the design of an annular intensity distribution.
Figure 14:
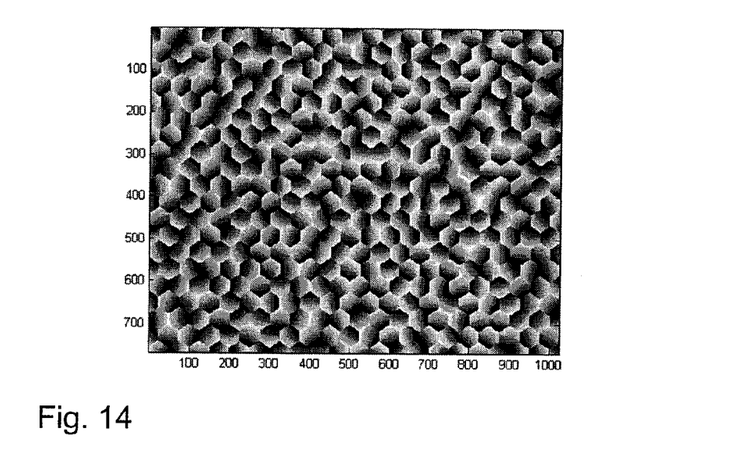
FIG. 14: Lens structure according to FIG. 13.
Figure 15:
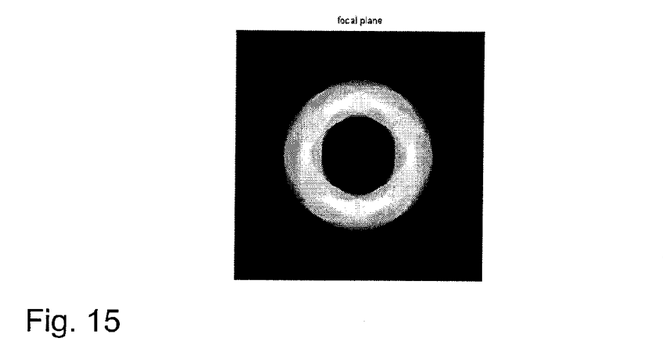
FIG. 15: Annular intensity distribution in the field levels.

According to FIG. 13, the used surface in the six edge array is distributed so that Lens 1 is located along with vertex 3 at a defined distance from the middle point of the corresponding six edges. The distance range is fixed along with the lens size and the inside and outside radius of an annular distribution. Voronoi points 2 deliver a hexagonal surface distribution. FIG. 14 shows the corresponding lens structure. FIG. 15 shows the intensity distribution in the field levels.

Figure 16:
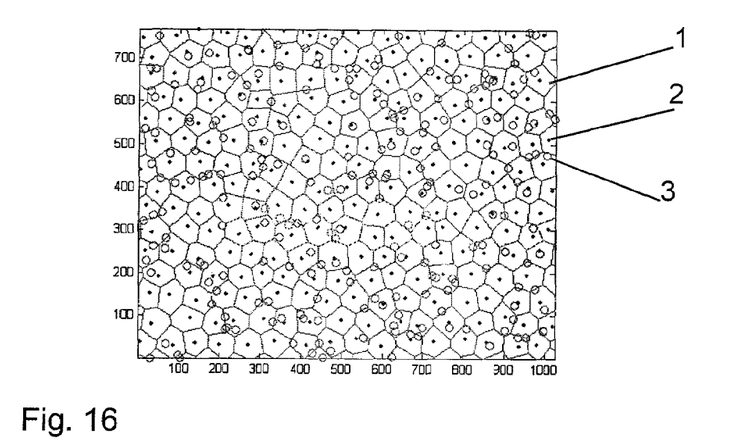
FIG. 16: Voronoi diagram with static surface distribution for the design of an annular intensity distribution.
Figure 17:
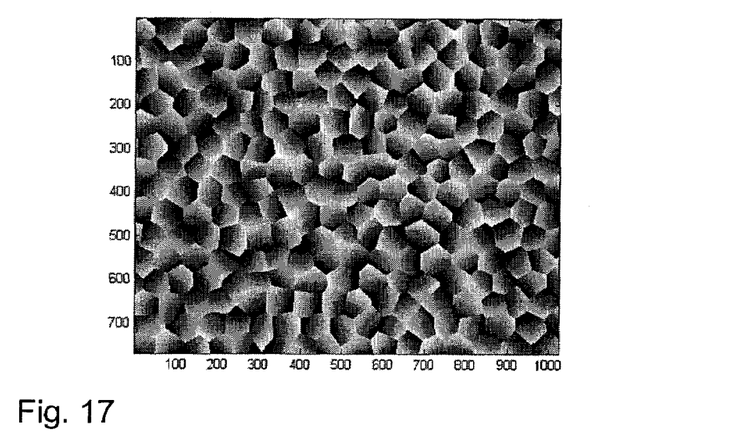
FIG. 17: Lens structure according to FIG. 16.
Figure 18:
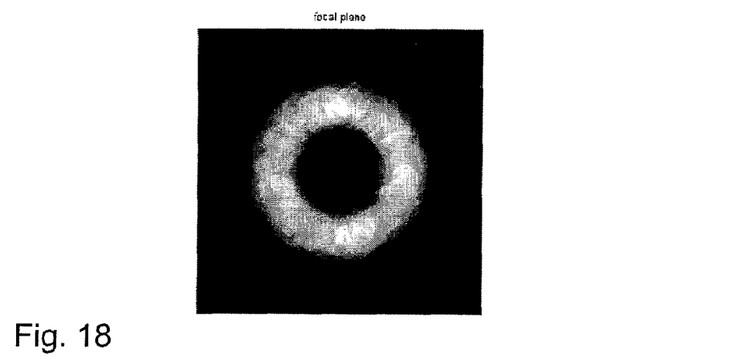
FIG. 18: Annular intensity distribution in the field levels.

A further solution shows FIG. 16 with a static lens distribution. Vertexes 3 have the same distance to Voronoi Point 2, which corresponds to the middle radius of the ring-shaped intensity distribution. FIG. 17 shows the corresponding lens structure. FIG. 18 shows the intensity distribution in the field levels, which in comparison with FIG. 15 has a similar ring-shaped illumination.

Figure 19:
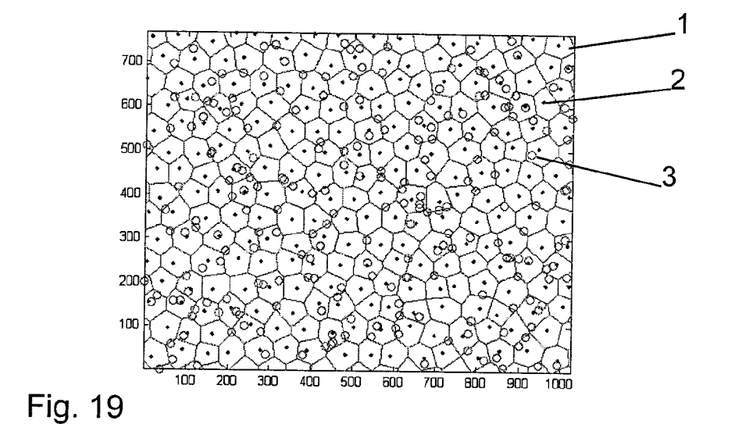
FIG. 19: Voronoi diagram with static surface distribution for the design of a Disar intensity distribution.
Figure 20:
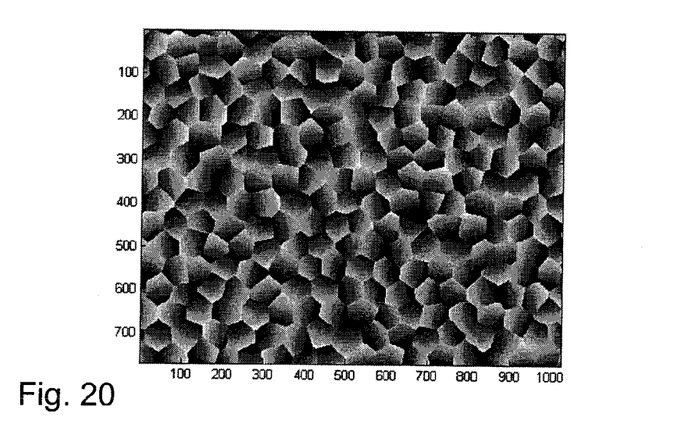
FIG. 20: Lens structure according to FIG. 19.
Figure 21:
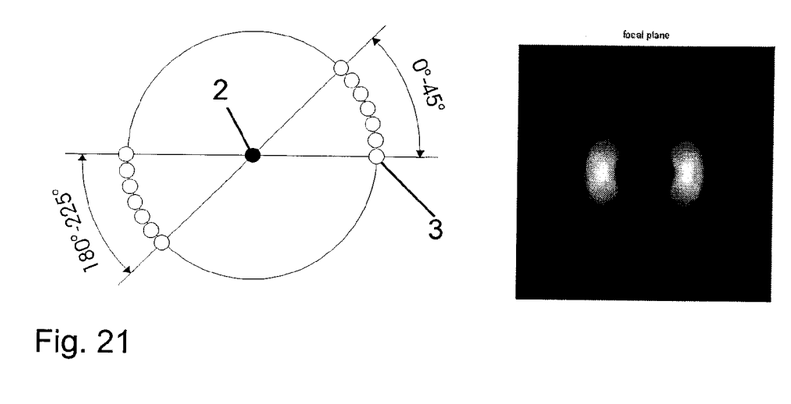
FIG. 21: Voronoi point distribution for a Disar intensity distribution.

FIGS. 19 to 22 show further application examples that use Disar and Quasar. FIG. 19 shows the static distribution of Lens 1. All Vertexes 3 keep the same distance from Voronoi points 2 to their corresponding Voronoi lens 1. FIG. 20 shows the corresponding lens structure. If the direction from a Voronoi point to the lens middle point is limited by any requirement, a Disar or similar shape may be achieved, as well as the angle of the illustrated must be between the section centroid of Voronoi Region 2, the vertex of Voronoi lens 3 and a reference line. FIG. 21 shows the angle boundary for the intensity distribution in the field levels of a Disar. The angle for a Disar should be $\{0\text{-}45°; 180\text{-}225°\}$.

Figure 22:
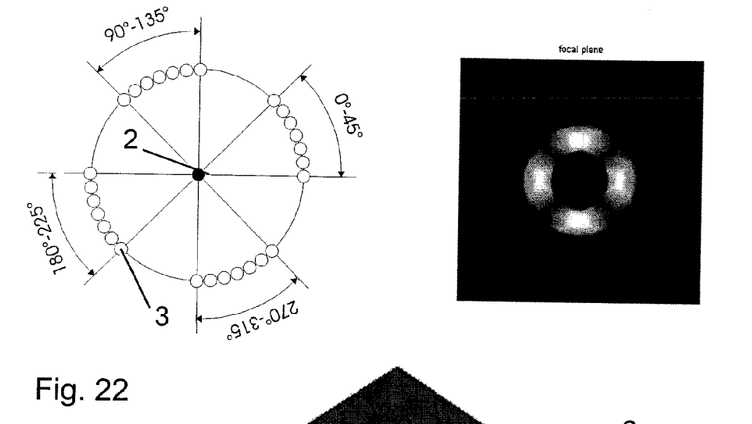
FIG. 22: Voronoi point distribution for a Quasar intensity distribution.

FIG. 22 shows the angle for creating a Quasar intensity distribution with an angular distribution $\{0\text{-}45°; 90\text{-}135°; 180\text{-}235°; 270\text{-}315°\}$.

FIGS. 23 to 26 exemplify further application examples of the invention, which in the distribution of polygonal Voronoi lens 1 includes a lens 6, which is surrounded by a toroidal lens 7. This configuration further serves for generating a "truncated Gauss" according to FIG. 6. The torus functions to deliver the circular shape opening for the columns under the Gauss profile and for bringing the Gauss to a higher intensity level, as well as for reducing the tail.

Within the Voronoi Regions 2, the maximal distances $d_{max}$ between the vertexes 3 of each Voronoi lens 3 and the edge points 8 are generally smaller than the internal Radius $R_1$ of each of the torus. The external radius R2 of the torus may preferably be twice the size of internal Radius $R_L$.

Figure 23:
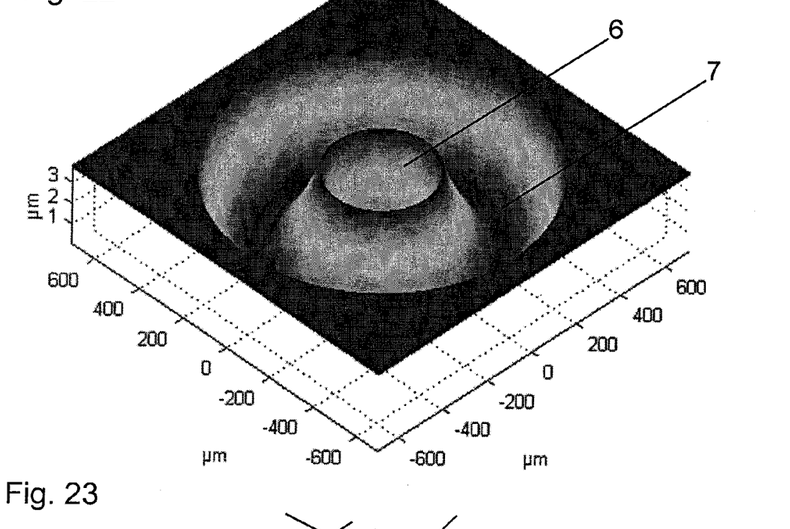
FIG. 23: Height profile for a spherical lens, which is surrounded with a torus.
Figure 24:
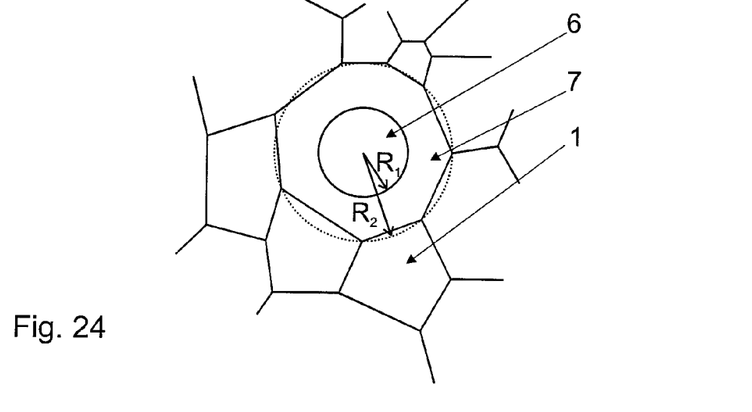
FIG. 24: Schematic description of a spherical lens which is surrounded with a torus and is connected to the Voronoi lenses.
Figure 25:
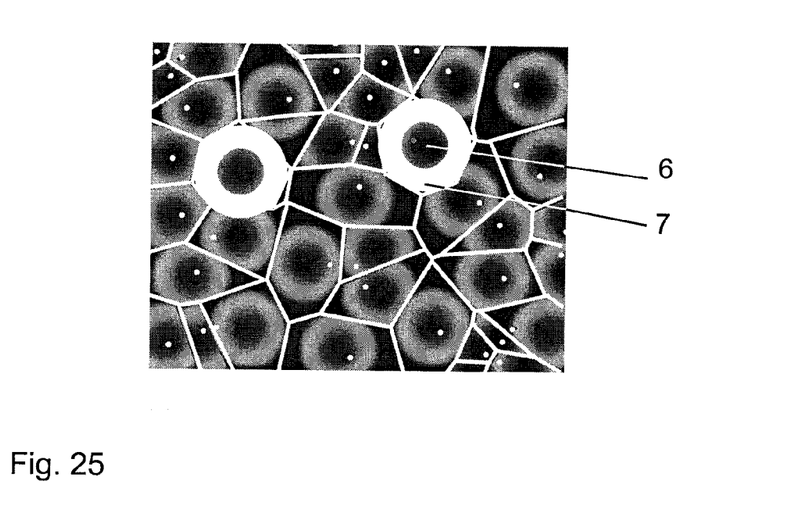
FIG. 25: Voronoi lens in combination with torus lenses.
Figure 26:
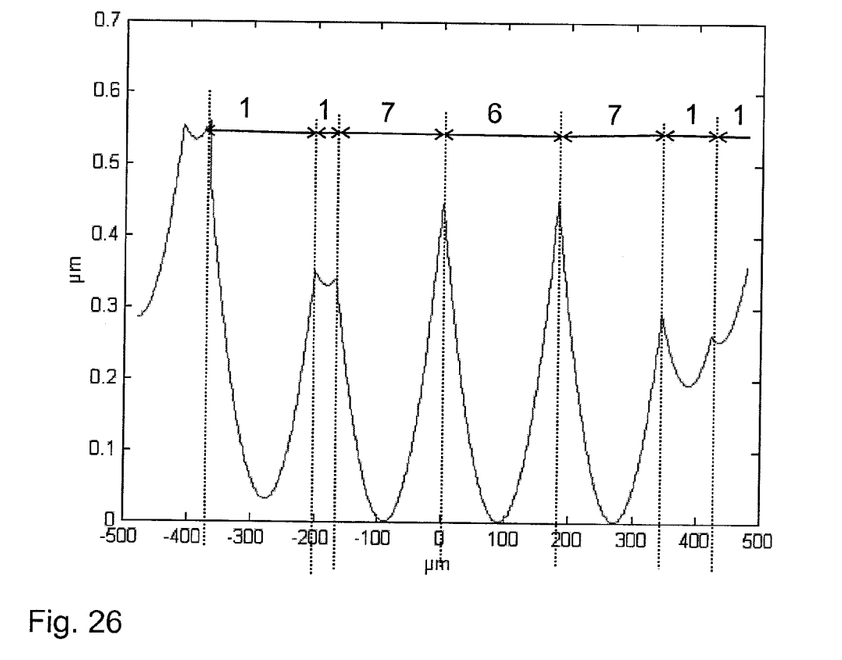
FIG. 26: Section through the middle of spherical lens and torus over and adjoining Voronoi Lens.

FIG. 23 shows a height profile for a spherical Lens 6, which is surrounded by a Torus 7. FIG. 24 schematically shows a spherical Lens 6 and the unclosed Torus 7 connected with Voronoi lens 1. FIG. 25 shows a structure with spherical Lens 6, torus 7 and Voronoi Lens 1. FIG. 26 shows a section through the middle of spherical Lens 6 and torus 7 over the adjoining Voronoi Lens 1.

BASIC CHARACTER LIST

| | |
|---|---|
| 1 | Voronoi lens |
| 2 | Centroid of the Voronoi Region (Voronoi Point) |
| 3 | Voronoi Lens vertex |
| 4 | Chrome layer |
| 5 | Lens rim |
| 6 | Spherical Lens |
| 7 | Surrounding torus |
| 8 | Farthermost distant corner |
| A | Distance from Voronoi Lens Vertex 3 to Voronoi Point 2 |
| $d_{max}$ | Distance from the farthermost distant corner 8 and vertex 3 |
| R | Radius of curvature of the Voronoi lens |
| $z(r)$ | Imaging equation |
| r | Distance between the vertex of a Voronoi lens and a Point p of this lens where $0 \leq r \leq d_{max}$ |
| c | $= 1/R$ |
| z | Depth based on the vertex, where $0 \leq z \leq z(d_{max})$ |
| k | Conical constant |
| $R_i$ | Torus internal radius |
| $R_a$ | Torus external radius |
| P | Quantity of N Points in the P level $\{p_1, p_2, p_3, \ldots p_N\}$ |
| P | A Point that belongs to P |
| q | A Point |

VD(P) Voronoi diagram for the P quantity (corresponding to the Voronoi lens border)

VR(p) Voronoi Region for a P point (corresponding to the surface of the Voronoi lens)

The invention claimed is:

1. Optics for beam shaping, comprising:
  a micro lens array in which a plurality of polygonal micro lenses are disposed in a surface, each polygonal microlens having corners and a lens rim having a length,
  whereby geometric arrangement of individual polygonal micro lenses and individual polygonal micro lens diameters follow a distribution pattern, wherein a number of the corners and the length of the lens rims of each of the polygonal micro lenses correspond to a Point distribution (P) and each of the individual polygonal micro lenses have a point which is a Voronoi Point, that defines a Voronoi Region (VR(p)), which is defined by the following equation for a Voronoi Lens:

$$z(r) = \frac{c \cdot r^2}{1 + \sqrt{1 - (1+k) \cdot c^2 \cdot r^2}} + a_4 \cdot r^4 + a_6 \cdot r^6 + \ldots$$

where r is a distance between a vertex of the Voronoi lens and a point p of the lens and $0 \leq r \leq d_{max}$ $c = 1/R$ and R is a radius of curvature of the Voronoi lens z is a distance based on the vertex, where $0 \leq z \leq z(d_{max})$; and k is a conical constant; and $a_n$ are aspheric coefficients.

2. Optics for beam shaping as claimed in claim 1, wherein each radius of curvature (R) of each Voronoi Lens is about 10 to about 200 times larger than a maximum distance (dmax), which is the greatest distance from one of the corners to the vertex of the Voronoi Lens.

3. Optics for beam shaping as claimed in claim 1, wherein the distance between the vertex and the Voronoi Point results in distance (A), which is the separation from Voronoi lens in one level, which is greater than zero and less than the radius of curvature (R) of the Voronoi lens, and the position of the vertex is selected such that substantially maximum radiation in an illumination zone of an optical configuration of the radiation points is obtained.

4. Optics for beam shaping as claimed in claim 3, wherein distance (A) of each polygonal micro lens is greater than zero and less than the radius of curvature (R) of each Voronoi Lens.

5. Optics for beam shaping as claimed in claim 1, wherein the lens rims have at least three corners and no more than twelve corners.

6. Optics for beam shaping as claimed in claim 5, wherein the lens rims have no more than six corners.

7. Optics for beam shaping as claimed in claim 1, wherein each Voronoi Lens has a different radius of curvature(R).

8. Optics for beam shaping as claimed in claim 7, wherein the Voronoi Lenses in the array have substantially the same radius of curvature(R).

9. Optics for beam shaping as claimed in claim 1, wherein the polygonal micro lenses are arranged in a regular pattern.

10. Optics for beam shaping as claimed in claim 1, wherein the polygonal micro lenses are arranged in an irregular pattern.

11. Optics for beam shaping as claimed in claim 1, wherein the Voronoi Lenses are aspheric or cylindrical in form, a combination of aspheric and cylindrical in form or a non-refractive from that can be described by the z(r) polynomial.

12. Optics for beam shaping as claimed in claim 1, further comprising additional concave or convex lenses, which are surrounded by concave or convex toroidally shaped forms.

* * * * *

UNITED STATES PATENT AND TRADEMARK OFFICE
CERTIFICATE OF CORRECTION

Page 1 of 1

PATENT NO.       : 7,443,589 B2
APPLICATION NO.  : 11/412059
DATED            : October 28, 2008
INVENTOR(S)      : Lars Erdmann et al.

It is certified that error appears in the above-identified patent and that said Letters Patent is hereby corrected as shown below:

On the Title Page:
Under Item (30) Foreign Application Priority Data:    delete "10 2005 019 257" and insert --10 2005 019 257.2--

Col. 6, line 57, delete "comers" and insert --corners--

Col. 8, lines 2-3, delete "comers" and insert --corners--

Signed and Sealed this
Twenty-fifth Day of January, 2011

David J. Kappos
*Director of the United States Patent and Trademark Office*